United States Patent [19]

Matsui et al.

[11] Patent Number: 5,221,941
[45] Date of Patent: Jun. 22, 1993

[54] TTL MULTIPLE FLASH CONTROL DEVICE

[75] Inventors: Akihiro Matsui, Sagamihara; Seiichi Yasukawa, Kawasaki, both of Japan

[73] Assignee: Nikon Corporation, Tokyo, Japan

[21] Appl. No.: 779,630

[22] Filed: Oct. 21, 1991

[30] Foreign Application Priority Data

Oct. 30, 1990 [JP] Japan ................... 2-292422

[51] Int. Cl.$^5$ .............................. G03B 15/05
[52] U.S. Cl. .................... 354/415; 354/416; 354/432
[58] Field of Search ............... 354/415, 416, 417, 429, 354/431, 432, 433

[56] References Cited

U.S. PATENT DOCUMENTS

| | | | |
|---|---|---|---|
| 3,823,410 | 7/1974 | Tokutomi et al. | 354/415 |
| 4,319,813 | 3/1982 | Aoki et al. | 354/25 |
| 4,549,801 | 10/1985 | Winter | 354/415 X |
| 4,808,811 | 2/1989 | Kumakura et al. | 250/214 L |
| 5,006,879 | 4/1991 | Takagi et al. | 354/413 |

FOREIGN PATENT DOCUMENTS 3524375 2/1986 Fed. Rep. of Germany .
3-68928 3/1991 Japan .

OTHER PUBLICATIONS

Patent Abstracts of Japan, vol. 14, No. 286 (P-1064) Jun. 20, 1990.

Primary Examiner—W. B. Perkey
Attorney, Agent, or Firm—Shapiro and Shapiro

[57] ABSTRACT

In a TTL multiple flash control device, information obtained from a preliminary flash emission is used to limit the quantity of light in a subsequent main flash emission. Electric signals produced from a plurality of photoelectric converters that receive reflected preliminary flash light, and that correspond to a plurality of photometric areas of an object field, are logarithmically transformed and peak detected to produce a field reflection distribution. Weighting coefficients determined from the field reflection distribution are used to weight the outputs of the photoelectric converters during main flash emission.

1 Claim, 6 Drawing Sheets

F I G. 2
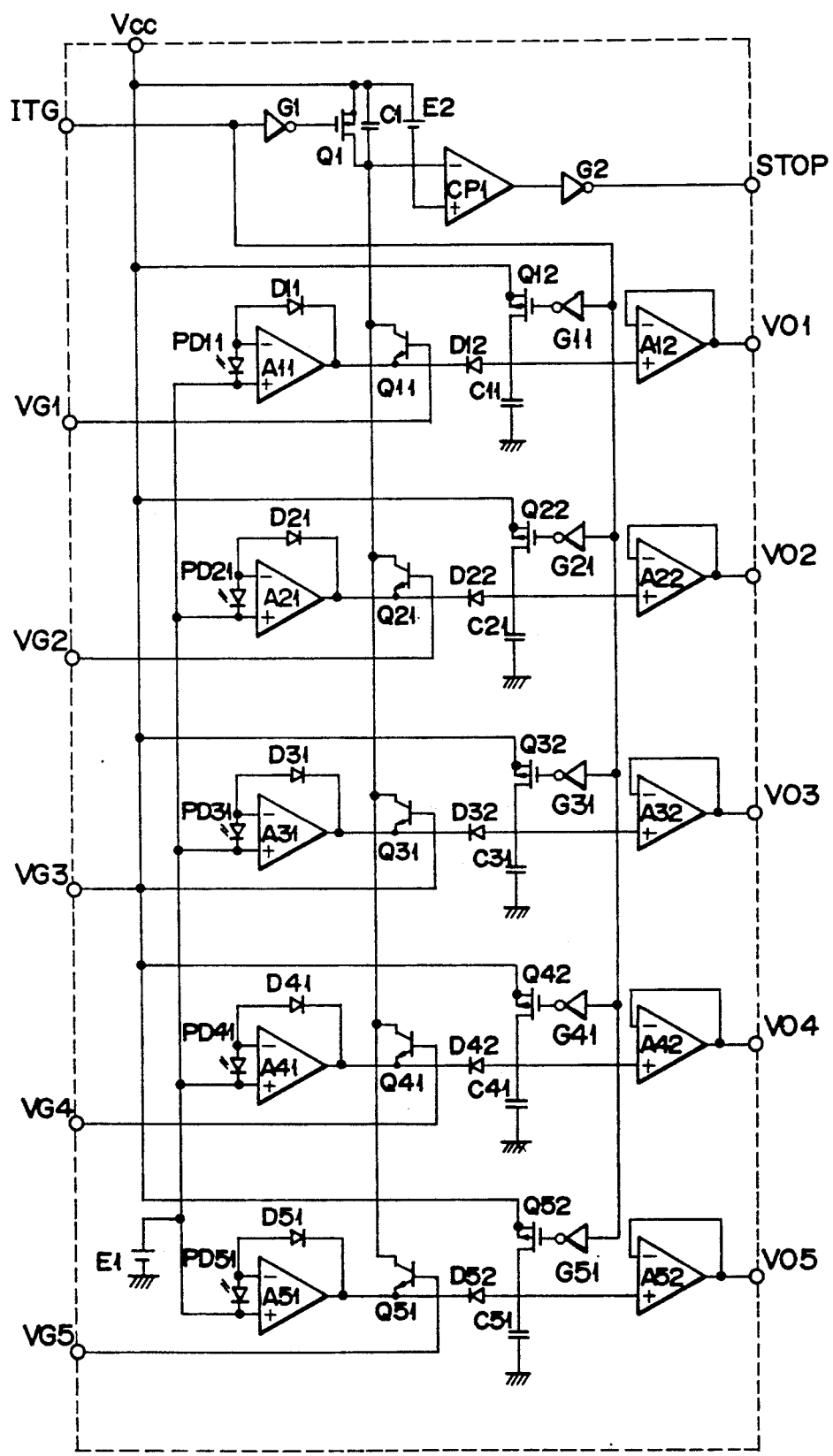

TTL MULTIPLE FLASH CONTROL DEVICE

BACKGROUND OF THE INVENTION

1. Field of the Invention

The present invention relates to an automatic flash control device for a photographic operation using an electronic flash in a camera having a focal plane shutter and, more particularly, to a TTL multiple flash control device based on a concept of multiple pattern photometry.

2. Related Background Art

A conventional camera having a TTL automatic flash control function includes one light-receiving element for performing a photometric operation of the entire film surface or a major portion thereof.

In operation of this camera, after a shutter is fully opened, an electronic flash emits light, and object image light reflected by the film surface is photoelectrically converted by a light-receiving element. A signal corresponding to an integrated value of the quantity of light of the light-receiving element is compared with a predetermined value. The amount of light from the electronic flash is controlled so that the film surface has a predetermined brightness level.

This scheme has a disadvantage in that various conditions in the field of view cannot be sufficiently satisfied because a detection area of the field of view is one-dimensional. As a result, an optimal exposure value of the principal object cannot be obtained.

In recent years, techniques for solving the above problem are being developed.

As one of these techniques, Japanese Patent Application No. 1-203735 proposes the following system by employing the concept of so-called multiple pattern photometry in TTL automatic flash control.

A plurality of photoelectric converting means capable of performing photometry of a plurality of areas constituting the field of view are arranged at a position where the quantity of light on the film surface is measured, and an electronic flash is caused to preliminarily emit light immediately before a focal plane shutter is opened. The light from the electronic flash is reflected by the object image, and the reflected light is reflected in turn by the surface of a shutter curtain. The resultant light is received by the plurality of photoelectric converting means, and outputs from these photoelectric converting means are independently integrated. The integrated values are detected as field reflection distributions of the areas upon flashing.

The detected field reflection distribution information of each area is arithmetically operated in accordance with a predetermined multiple pattern algorithm. Therefore, the degrees of weighting of the respective divided areas are determined to optimize exposure for the principal object.

As soon as the shutter is opened, the electronic flash emits light, and light reflected by the film surface is received by the same plurality of photoelectric converting means. After the outputs from these photoelectric converting means are weighted with predetermined weighting coefficients, the weighted outputs are added and integrated. The resultant value is compared with the predetermined value to stop flashing of the electronic flash at a timing determined by this comparison, thereby completing automatic flash control.

This TTL automatic flash control scheme is called "TTL multiple flash control".

This TTL multiple flash control is characterized in that the plurality of photoelectric converting means are located at a position where light reflected by the shutter surface capable of performing photometry in each of the plurality of divided areas constituting the field is received, and that each of independent integrated values of the values output from the plurality of photoelectric converting means is defined as field reflection distribution information of each area, and this information is arithmetically operated in accordance with the predetermined multiple pattern algorithm.

When an integrated voltage as an output from each photoelectric converting means is to be A/D-converted and digital data is to be input to a microcomputer, the quantity of light is decreased with respect to the quantity of light corresponding to a full A/D conversion scale such that a quantity of light corresponding to a one-stopped-down value (1 EV) is $\frac{1}{2}$ the full scale, a quantity of light corresponding to a two-stopped-down value is $\frac{1}{4}$ the full scale, a quantity of light corresponding to a three-stopped-down value is $\frac{1}{8}$ the full scale, and the like. Therefore, the A/D conversion resolution is undesirably decreased.

For example, when an 8-bit A/D converter is used, with a decrease in light quantity, a photoelectric conversion value allowing data read at a resolution of about 8 LSB/stop is a maximum of a 5-stopped-down value of the quantity of light corresponding to the full scale.

SUMMARY OF THE INVENTION

It is, therefore, an object of the present invention, in consideration of the conventional problems described above, to provide a TTL multiple flash control device capable of increasing a resolution of an output from a photoelectric converting means.

According to the present invention, there is provided a multiple flash control device for a camera having electronic flash means for performing main flashing and preliminary flashing for obtaining information used to limit a quantity of light of the main flashing, comprising:

a plurality of photoelectric converting means for receiving light beams corresponding to a plurality of photometric areas constituting a field of view during the preliminary flashing and main flashing, converting the light beams into photocurrents, respectively, and outputting electric signals corresponding to the photocurrents, respectively;

logarithmic transforming means for logarithmically transforming outputs from the plurality of photoelectric converting means;

peak holding means for detecting outputs from the logarithmic transforming means which correspond to maximum values of the outputs from the plurality of photoelectric converting means and holding the outputs from the logarithmic transforming means;

arithmetic means for obtaining a field reflection distribution on the basis of outputs from the peak holding means and determining weighting coefficients of the photometric areas during the main flashing on the basis of the field reflection distribution; and flashing limiting means for weighting the outputs from the plurality of photoelectric converting means in accordance with the weighting coefficients determined by the arithmetic means, adding the weighted outputs, and limiting a quantity of light during the main flashing on the basis of a sum of the weighted outputs.

In the above device, light reflected by the object image upon preliminary flashing is reflected by the surface of the shutter curtain and is received by the plurality of photoelectric converting means. The outputs from these photoelectric converting means are independently logarithmically transformed to obtain peak hold values of voltages whose ranges are compressed. These peak hold values are detected as field reflection distributions of the respective areas. Information of each area is arithmetically operated in accordance with a predetermined multiple pattern algorithm. The weighting coefficients of the respective divided areas are determined to obtain an optimal exposure value for the principal object. As soon as the shutter is opened, the electronic flash performs main flashing, and light reflected by the film surface is received by the plurality of photoelectric converting means. The outputs from the photoelectric converting means are weighted, added, and integrated. The integrated value is compared with a predetermined value to determine a flashing end timing, thereby stopping flashing of the electronic flash and hence completing the TTL multiple flash control.

Since the field reflection distribution information obtained by the preliminary flashing is detected such that the maximum value of the flashing waveform is peak-held, the outputs from the photoelectric converting means are larger than the conventional values.

In addition, since the waveform of flashing of the electronic flash is extracted as a peak-held voltage compressed through logarithmic transformation, the dynamic range can be widened. The position of the principal object can be predicted with a high probability, thereby calculating an optimal exposure value for the principal object.

As described above, according to the present invention, when flash photography is to be performed in accordance with the TTL multiple flash control scheme, the field reflection distribution information can be extremely accurately obtained by a single preliminary flashing cycle which does not require flash control and free from consideration of a detection range. Therefore, photography having minimum variations in exposure of the principal object can be performed in correspondence with various object conditions.

BRIEF DESCRIPTION OF THE DRAWINGS

FIGS. 1 to 6 show an embodiment of the present invention, in which:

FIG. 1 is a block diagram of this embodiment;

FIG. 2 is a circuit diagram showing an internal arrangement of a photometry and quantity of light control circuit shown in FIG. 1;

FIG. 3 is a sectional view showing an optical layout of photoelectric converting means;

FIG. 4 is a view showing a relationship between optical positions of an opening area of a film surface, the photoelectric converting means, and a condenser lens;

FIG. 5 is a view showing the structure of the photoelectric converting means and the condenser lens; and FIG. 6 is a timing chart showing an operation of this embodiment.

DETAILED DESCRIPTION OF THE PREFERRED EMBODIMENT

The present invention will be described in detail with reference to a preferred embodiment.

Figure 1:
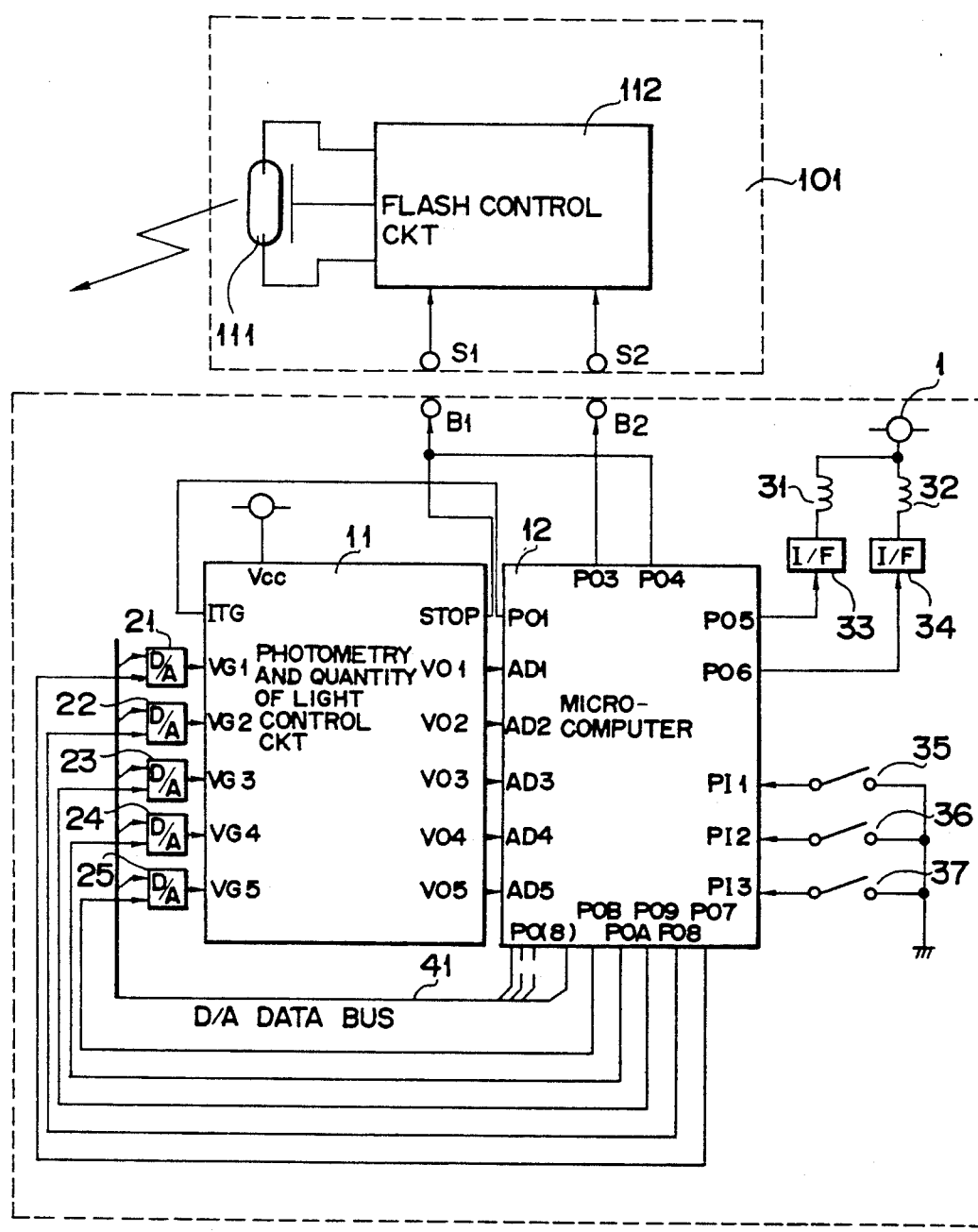

FIG. 1 is a block diagram showing an embodiment of the present invention.

This embodiment exemplifies a circuit arrangement including a camera body 1 and an electronic flash 101. The camera body 1 is connected to the electronic flash 101 through contacts B1 and B2 and contacts S1 and S2.

The electronic flash 101 comprises a flash unit 111 and a flash control circuit 112 including a booster circuit, a main capacitor, and a flash control SCR. Basically, a flashing start signal from the contact S2 and a flashing stop signal from the contact S1 control the start and end of flashing of the flash unit 111 through the flash control circuit 112.

The camera body 1 comprises a photometry and quantity of light control circuit 11 and a microcomputer 12 and constitutes a TTL multiple flash control circuit of the present invention.

The internal arrangement of the photometry and quantity of light control circuit 11 will be described below with reference to FIG. 2.

Figure 4:
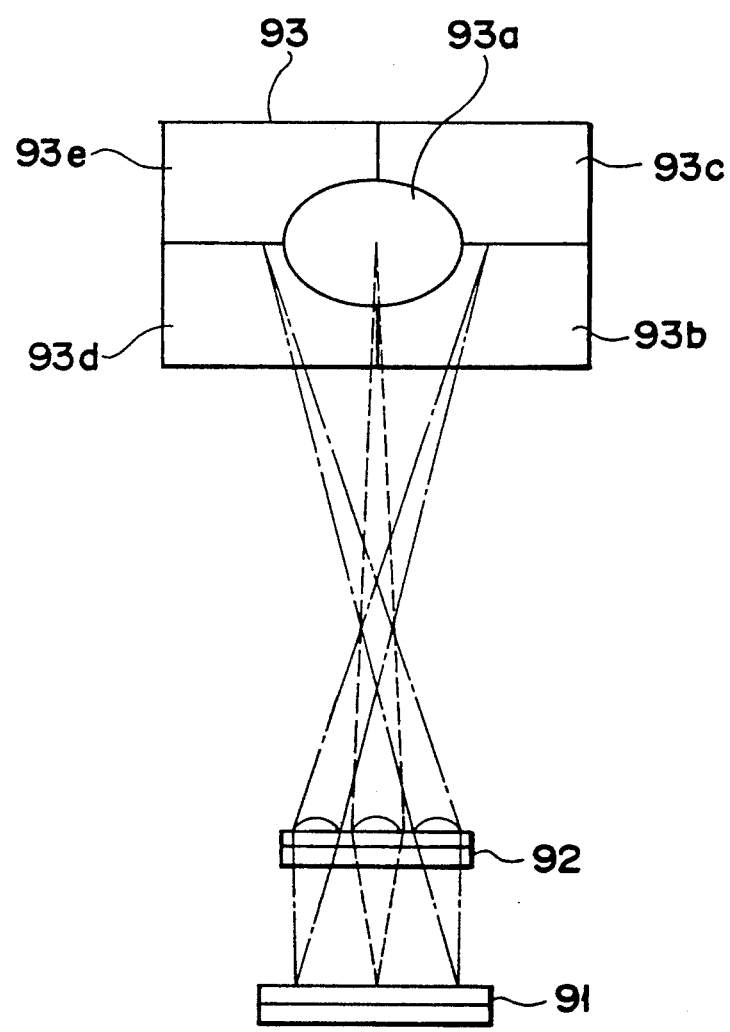
Figure 5:
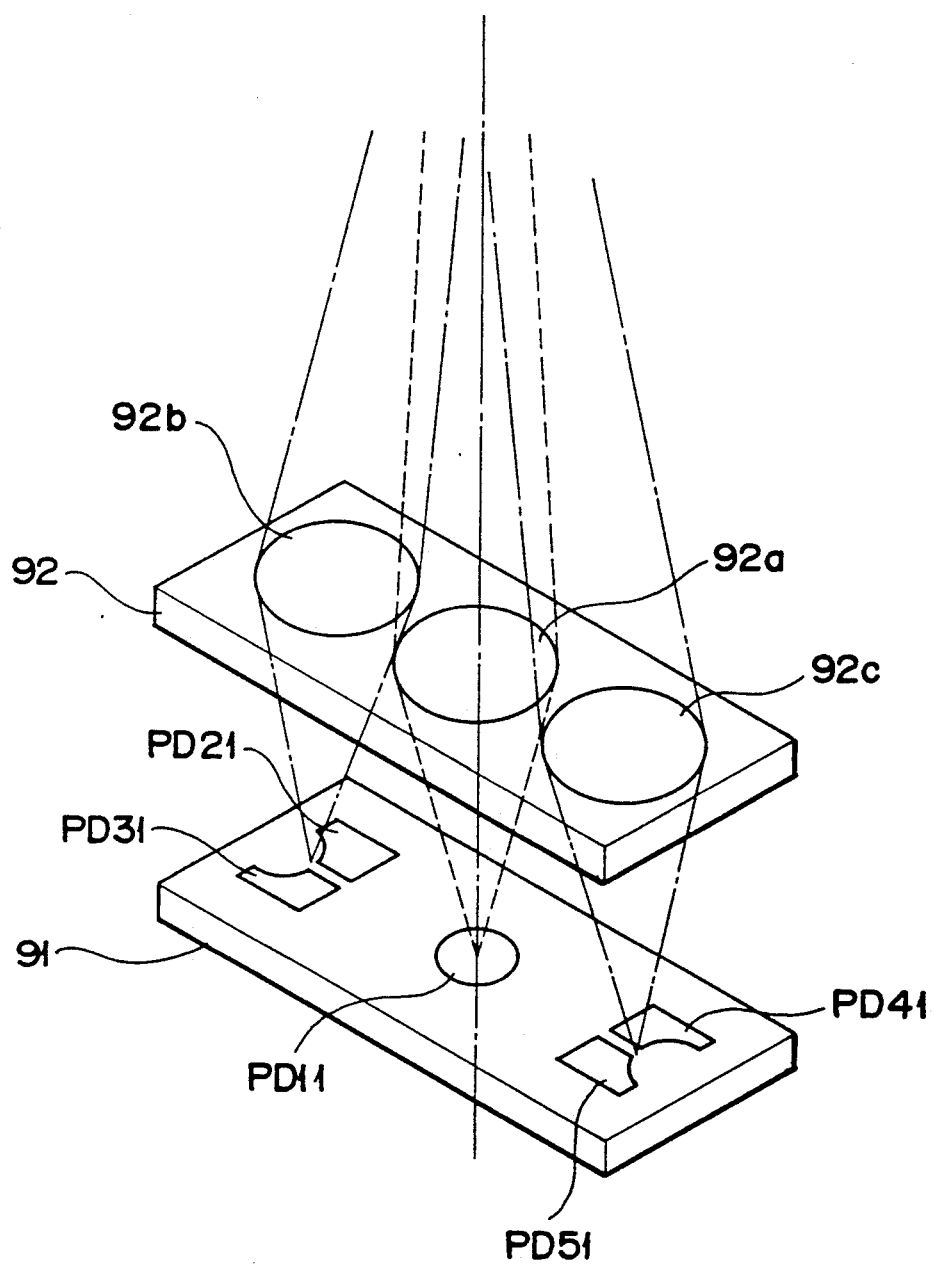

Five photodiodes PD11 to PD51 are photoelectric converting means assigned to five flash control areas shown in FIGS. 4 and 5, respectively. The photodiodes PD11 to PD51 output photocurrents proportional to illuminances, respectively. The peaks of these photocurrents are held and serve as voltages at output terminals V01 to V05.

Although the respective photometry and quantity of light control circuit units are independently operated, since these circuit unit arrangements are identical to each other, only a circuit unit for outputting a voltage at the output terminal V01 is representatively described below.

The photocurrent output from the photodiode PD11 is logarithmically transformed using a reference power source El as a base by an OP amplifier A11 feed-back controlled by a diode D11, so that the range of the photocurrent is converted into a compressed voltage output (logarithmic transforming means).

A transistor Q11 receives the voltage compressed through logarithmic transformation as its emitter potential and an input voltage from a gain input terminal VG1 as its base potential. The transistor Q11 outputs a collector current whose range is expanded by reverse logarithmic transformation with a gain determined by a potential difference between the emitter and base potentials.

When an integration control signal input terminal ITG is set at H level, an FET Q12 is kept on, and a capacitor C11 is kept charged by an application voltage VCC. When a signal at the input terminal ITG goes to L level, the FET Q12 is turned off, and the capacitor C11 is discharged to a voltage higher than a peak voltage of the voltage compressed through logarithmic transformation by a forward cutoff voltage VF of a diode D12.

Even if the quantity of light received by the photodiode PD11 is decreased and an output voltage of the OP amplifier A11 is increased, the diode D12 is reverse-biased, and the capacitor C11 will not be charged again.

The charge voltage of the capacitor C11 is fixed to the voltage obtained by logarithmically transforming the peak of the quantity of light. The peak-held voltage is held through a follower amplifier A12 and is output to the output terminal V01 (peak holding means).

The four remaining circuit units which output the voltages V02 to V05 operate similarly, and collector currents from the transistor Q11 and transistors Q21 to Q51 are added to charge the capacitor C1.

The voltage stored in the capacitor C1 is compared with a reference voltage E2 by a comparator CP1. When the voltage charged by the capacitor C1 is higher than the reference voltage E2, an output from the comparator CP1 goes from L level to H level in accordance with the characteristics of the level detector. An output terminal STOP goes from H level to L level by an inverter G2.

The inverted signal is input to the integration control signal input terminal ITG through the microcomputer 12 and is inverted by an inverter G11. This inverted signal serves as an ON signal for an FET Q1. When the FET Q1 is turned on, the capacitor C1 is completely discharged.

In the series of operations described above, the microcomputer 12 processes data from the photometry and quantity of light control circuit 11, thereby controlling the photometry and quantity of light control circuit 11.

Referring back to FIG. 1, operations of the microcomputer 12 will be described below.

The microcomputer 12 sets output voltages of D/A converters 21 to 25 in accordance with data supplied from an 8-bit output port PO(8) to the D/A converters 21 to 25 through a data bus 41 and selection signals from the five terminals, i.e., output ports P07 to P08 for selecting a D/A converter. The set values are input to the gain input terminal VG1 and gain input terminals VG2 to VG5 of the photometry and quantity of light control circuit 11 as reference voltages during compression through logarithmic transformation.

The five peak-held voltage output terminals V01 to V05 of the photometry and quantity of light control circuit 11 are respectively connected to A/D conversion input terminals AD1 to AD5 of the microcomputer 12, and an output port P01 is connected to the integration control signal input terminal ITG.

The arrangement in FIG. 1 includes magnets 31 and 32 for holding states of preceding and following shutter curtains in accordance with signals to be described later. The magnets 31 and 32 are controlled in accordance with signals from output ports P05 and P06 of the microcomputer 12 through interfaces 33 and 34, respectively.

Mechanical switches 35 and 36 are operated in accordance with a drive sequence of the camera. A mirror-up switch 35 is turned on when a mirror-up operation is completed. A synchronizing switch 36 is turned on when the shutter is fully opened. A release start switch 37 is turned on when a user depresses a shutter release button. Signals from the mirror-up switch 35, the synchronizing switch 36, and the release start switch 37 are respectively connected to input ports P11 to P13 with pull-up resistors of the microcomputer 12.

The output terminal STOP of the photometry and quantity of light control circuit 11 is electrically connected to the flash control circuit 112 in the electronic flash 101 through the contact B1 with the flash unit 101. In this case, the output terminal STOP serves as a flashing stop signal terminal. An output port P03 of the microcomputer 12 is connected to the flash unit 101 through the contact B2. In this case, the output port P03 serves as a flashing start signal terminal.

Figure 3:
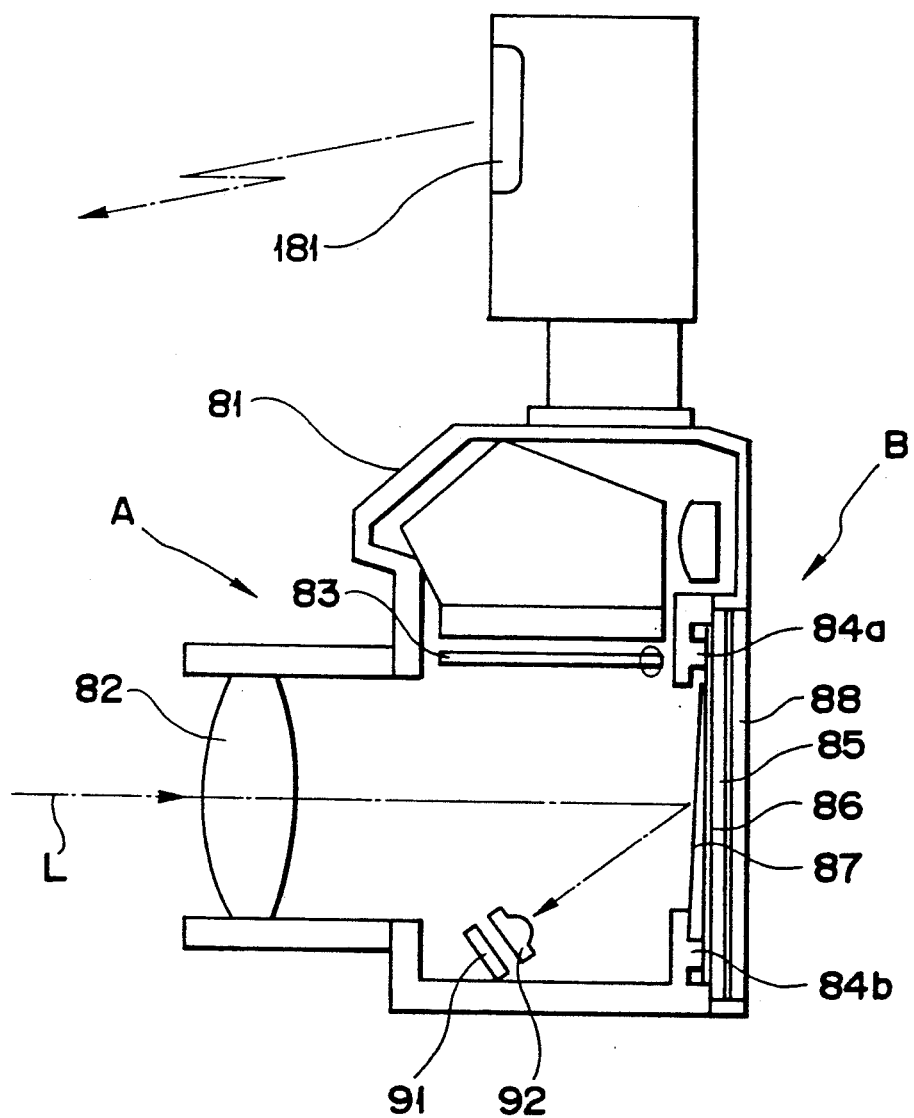

FIG. 3 is a sectional view showing an optical layout of the photoelectric converting means in this embodiment. An electronic flash 181 is connected to a camera body 81.

In the camera body 81, a movable mirror 83 is retracted from an optical path, and a film 86 is fixed by inner rails 84a and 84b and a press plate 85 at a focusing position of a beam passing through a photographic lens 82. A preceding shutter curtain 87 of the focal plane shutter is located in front of the film 86 so as to prevent exposure of the film to the light except for a photographic operation. Therefore, the preceding shutter curtain 87 shields light in front of the film 86.

During exposure, i.e., while the preceding shutter curtain 87 is located in a retracted position, a beam L from the object is refracted by the photographic lens 82 and is focused on the surface of the film 86. The light incident on the surface of the film 86 is partially reflected and reaches a photoelectric converting means 91 through a condenser lens 92.

During an operation except for exposure, i.e., while the preceding shutter curtain 87 is located at a position shown in FIG. 3, the beam L from the object is refracted by the photographic lens 82 and is focused on the surface of the preceding shutter curtain 87 in a state almost the same as the state on the film surface. The beam incident on the surface of the preceding shutter curtain 87 is partially reflected and reaches the photoelectric converting means 91 through the condenser lens 92 in the same manner as described above.

FIGS. 4 and 5 show the structure of the main part of the photoelectric converting means of the present invention. FIG. 4 is a view showing a relationship between optical positions of an opening area 93 of a film surface, the photoelectric converting means 91, and the condenser lens 92 when viewed from a direction indicated by an arrow A in FIG. 3. FIG. 5 is a view showing the structure of the photoelectric converting means 91 and the condenser lens 92.

The opening area 93 of the film surface is divided into five areas, i.e., a central circular portion 93a and four peripheral portions 93b, 93c, 93d, and 93e by the photoelectric converting means 91 and the condenser lens 92, as will be described in detail with reference to FIG. 5. The photoelectric converting means 91 comprises a circular light-receiving area PD11 and four rectangular light-receiving areas PD21, PD31, PD41, and PD51 each of which is arcuatedly notched to correspond to the ¼ arc of the circular light-receiving portion PD11. The condenser lens 92 is an optical member having three lens portions 92a, 92b, and 92c on its upper surface so as to correspond to three blocks, i.e., central, left, and right blocks of the light-receiving areas.

An image reflected by the film surface or the shutter surface is divided by the condenser lens 92 into portions corresponding to the five light-receiving areas PD11, PD21, PD31, PD41, and PD51 of the photoelectric converting means 91, as shown in FIG. 5. More specifically, the five light-receiving areas PD11, PD21, PD31, PD41, and PD51 respectively correspond to the areas 93a, 93b, 93c, 93d, and 93e of the opening portion of the film surface shown in FIG. 4, so that the photoelectric converting means separately performs photometry for measuring the brightness levels of the five divided areas.

Referring to FIG. 5, optical paths are indicated by broken lines, alternate long and short dashed lines, and alternate long and two short dashed lines, and beams from the object area (i.e., beams reflected by the central, left half, and right half portions of the opening portion 93 of the film surface) pass through the lens portions 92a to 92c of the condenser lens 92, respectively. The three transmitted beams are mostly focused on the three blocks, i.e., the central, left, and right blocks consisting of the five light-receiving areas PD11 to PD51 of the photoelectric converting means 91. The quantities of beams are converted into photocurrents by the photoelectric converting means 91. These photocurrents are input to the photometry and quantity of light control circuit 11. The photocurrents are then converted into digital signals, and the digital signals are processed by the microcomputer 12, thereby controlling the system.

An overall operation of the components shown in FIGS. 1 and 2 will be described with reference to a timing chart in FIG. 6.

Figure 6:
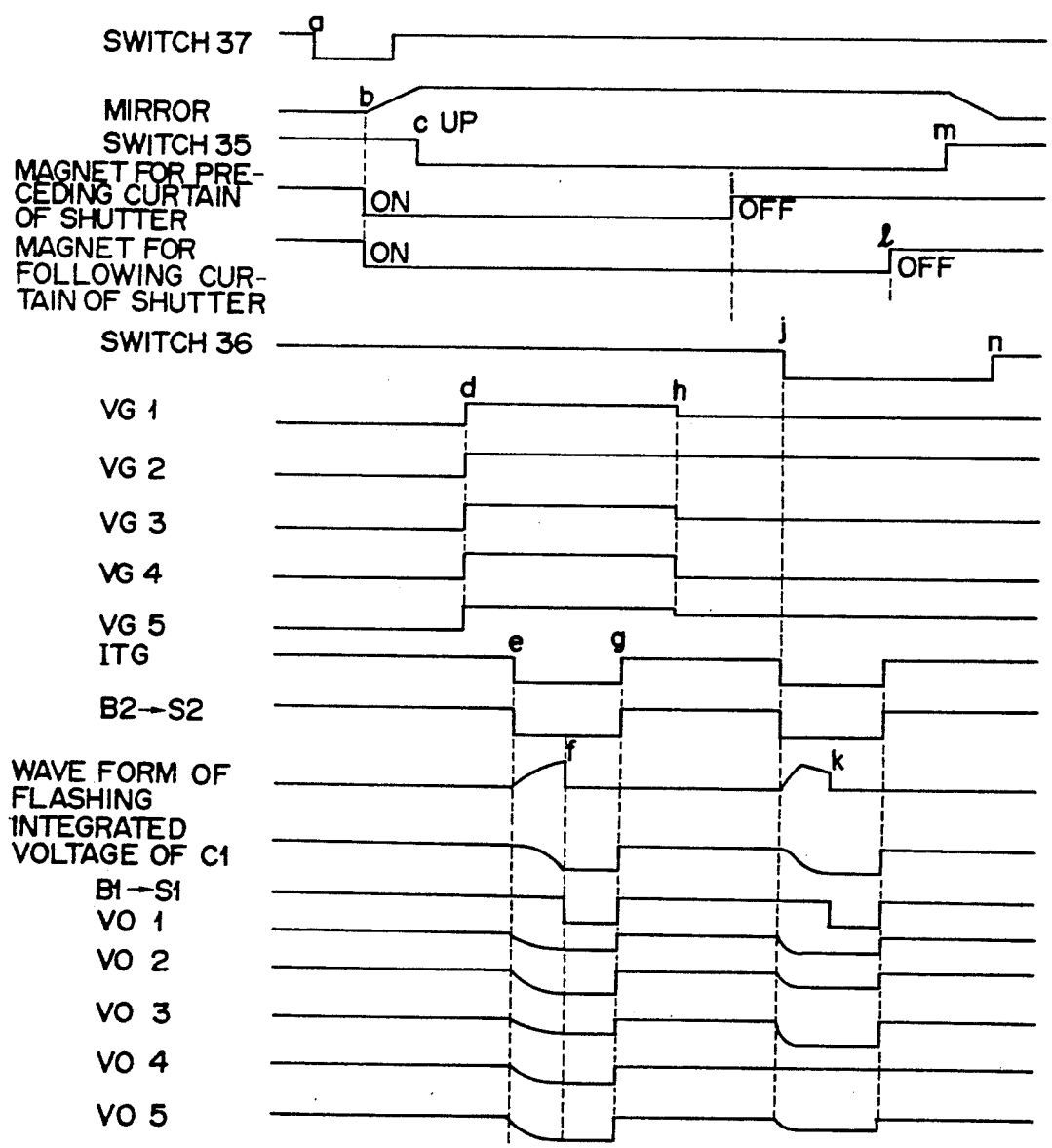

The release start switch 37 is turned on at time a in FIG. 6.

The magnets 31 and 32 of the preceding and following shutter curtains are energized, and at the same time, a mirror-up operation is started at time b in FIG. 6, thereby starting a release operation.

At time c in FIG. 6, the microcomputer 12 waits until the switch 35 is turned on so as to indicate that the mirror-up operation is completed. When the switch 35 is turned on, the microcomputer 12 sends predetermined common data to the D/A converters 21 to 25 in accordance with a control signal from the microcomputer 12, thereby performing D/A conversion.

At time d in FIG. 6, the A/D-converted voltages having the same potential are applied to the gain voltage input terminals VG1 to VG5 of the photometry and quantity of light control circuit 11.

At time c in FIG. 6, a signal of L level is input to the input terminal ITG of the photometry and quantity of light control circuit 11. At the same time, a control signal goes to L level through the contact B2 for the electronic flash 101 so as to start preliminary flashing. Therefore, the quantity of light of the electronic flash 101 is increased as indicated by a waveform of flashing (time e to time f in FIG. 6) of the timing chart.

As described for the above photometry and quantity of light control circuit 11, during a time interval between time e and time f in FIG. 6, the photodiodes PD11 to PD51 which have received the field reflection beams output photocurrents having amplitudes proportional to the magnitudes of the field reflection beams. These photocurrents are transformed into voltages compressed through logarithmic transformation. Upon switching of the FET Q12 and FETs Q22 to Q52, the capacitor C11 and capacitors C21 to C51 are discharged to voltages higher than the minimum voltages compressed through logarithmic transformation by the forward cutoff voltages VF, respectively. The voltages at the output terminals V01 to V05 fall as indicated by the waveforms shown in FIG. 6. The voltages shown in FIG. 6 are obtained such that voltages obtained by amplifying the photocurrents with predetermined gains are compressed through logarithmic transformation.

During a time interval between time f and time g in FIG. 6, the quantity of light need not be subjected to automatic flash control during preliminary flashing. Note that since energy saving is desired, flashing may be stopped for a predetermined short period of time (e.g., 10 μsec) upon flashing under the control of the microcomputer 12. In this case, when a signal of L level is output from the output port P04 of the microcomputer 12, the contact B1 can be wired-OR to L level, thereby controlling the electronic flash. The electronic flash 101 stops flashing for a short period of time in accordance with this control signal. Therefore, since the photocurrents of the photodiodes PD11 to PD51 then disappear, the peak hold capacitors C11 to C51 stop discharge, thereby holding the voltages at the output terminals V01 to V05.

The voltages peak-held by the capacitors C11 to C51 and the FETs Q12 to Q52 are converted into voltage outputs of low impedances by the follower amplifier A12 and follower amplifiers A22 to A52.

Meanwhile, the peak-held voltages are A/D-converted by A/D converters incorporated in the microcomputer 12, and the conversion results are used to determine weighting coefficients of the division areas during main flashing for photography in accordance with the predetermined multiple pattern arithmetic algorithm.

At time g in FIG. 6, when multiple pattern arithmetic operations are completed, the input terminal ITG and the contact B2 go to H level to charge the peak hold capacitors C11 to C51 in the photometry and quantity of light control circuit 11 so as to be ready for the next main flashing cycle.

A/D conversion is performed in the five channel D/A converters 21 to 25 while the weighting coefficients of the division areas obtained during preliminary flashing are reflected and the gains for the film sensitivity are adjusted. The gain set voltages of the respective channels are output to the output terminals VG1 to VG5.

In a division area having a larger weighting coefficient, the current is amplified with a higher gain to obtain data compressed through logarithmic transformation.

At time i in FIG. 6, the magnet 31 for the preceding shutter curtain is deenergized to start an actual shutter release operation, thereby running the preceding shutter curtain.

At time 1 in FIG. 6, when the synchronization switch 36 is turned on to indicate a fully open state of the shutter, the input terminal ITG and the contact B2 immediately go to L level, thereby generating a command to start main flashing of the electronic flash 101. At the same time, the photometry and quantity of light control circuit 11 is ready for the start of integration.

The electronic flash 101 performs flashing, as indicated by the waveform of flashing in FIG. 6 to charge the integrating capacitor C1 in the photometry and quantity of light control circuit 11 in accordance with a total sum of weighted currents whose ranges are expanded through reverse logarithmic transformation.

At time k in FIG. 6, when the voltage of the integrating capacitor C1 exceeds the predetermined reference voltage E2, the output terminal STOP goes from H level to L level by the action of the comparator CP1, and its signal is output from the contact B1 to the terminal S1 to stop flashing of the electronic flash 101.

At this time, the exposure in photography using the electronic flash 101 as a light source is completed.

At time λ in FIG. 6, the magnet of the preceding shutter curtain is deenergized in accordance with the program of the microcomputer 12. When a time corresponding to the set shutter speed elapses, the magnet 32 of the following shutter curtain is deenergized.

At time m in FIG. 6, the mirror-up switch 35 is turned off. At time n in FIG. 6, the synchronization switch 36 which is turned on in a fully open state of the shutter goes to H level. All the switches associated with each sequence return to the original OFF states. Therefore, the shutter release operations are completed.

What is claimed is:

1. A multiple flash control device for a camera having electronic flash means for performing main flashing and preliminary flashing for obtaining information used to limit a quantity of light of the main flashing, comprising:

a plurality of photoelectric converting means for receiving light beams corresponding to a plurality of photometric areas constituting a field of view during the preliminary flashing and main flashing, converting the light beams into photocurrents, respectively, and outputting electric signals corresponding to the photocurrents, respectively;

logarithmic transforming means for logarithmically transforming outputs from said plurality of photoelectric converting means;

peak holding means for detecting outputs from said logarithmic transforming means which correspond to maximum values of the outputs from said plurality of photoelectric converting means and holding the outputs from said logarithmic transforming means;

arithmetic means for obtaining a field reflection distribution on the basis of outputs from said peak holding means and determining weighting coefficients of the photometric areas during the main flashing on the basis of the field reflection distribution; and flashing limiting means for weighting the outputs from said plurality of photoelectric converting means in accordance with the weighting coefficients determined by said arithmetic means, adding the weighted outputs, and limiting a quantity of light during the main flashing on the basis of a sum of the weighted outputs.

* * * * *